United States Patent [19]

Plishka

[11] Patent Number: 5,629,277
[45] Date of Patent: May 13, 1997

[54] PAINT REMOVING COMPOSITION

[75] Inventor: Martin J. Plishka, Carefree, Ariz.

[73] Assignee: William L. Brown, Miami, Fla.

[21] Appl. No.: 539,171

[22] Filed: Oct. 4, 1995

[51] Int. Cl.$^6$ .................................. C11D 3/10; C11D 3/43
[52] U.S. Cl. ......................... 510/202; 510/118; 510/174; 510/201; 134/38
[58] Field of Search ...................... 252/162, 163, 252/DIG. 5, DIG. 8; 134/38; 510/118, 174, 201, 202

[56] References Cited

U.S. PATENT DOCUMENTS

| | | | |
|---|---|---|---|
| 3,382,181 | 5/1968 | Oberdorfer | 252/170 |
| 4,017,615 | 4/1977 | Shastri et al. | 424/241 |
| 4,508,634 | 4/1985 | Elepano et al. | 252/163 |
| 5,024,780 | 6/1991 | Leys | 252/162 |
| 5,080,822 | 1/1992 | Van Eenam | 252/170 |
| 5,094,771 | 3/1992 | Ahmed et al. | 252/99 |
| 5,318,715 | 6/1994 | Krishnan | 252/99 |
| 5,328,489 | 7/1994 | Beaujean et al. | 8/111 |
| 5,346,640 | 9/1994 | Leys | 252/162 |
| 5,419,848 | 5/1995 | Van Eenam | 252/164 |
| 5,437,686 | 8/1995 | Heffner et al. | 8/111 |

*Primary Examiner*—Douglas J. McGinty
*Assistant Examiner*—Gregory R. Delcotto
*Attorney, Agent, or Firm*—David L. Mossman

[57] ABSTRACT

A composition for removing paint, particularly graffiti, is described which contains an alkylene carbonate, which may be propylene carbonate, butylene carbonate or mixtures thereof; propylene glycol as a hydrotrope, and a polypropylene glycol having a molecular weight of at least 200. In one embodiment, the composition also contains a hydroxyalkylcellulose thickener, for example, at least 0.5 volume percent hydroxymethylcellulose may be present. In another embodiment, the composition contains no N-methylpyrrolidone, amine, DMSO, isocetyl alcohol or surfactant, unlike some prior graffiti-removing compositions.

3 Claims, No Drawings

PAINT REMOVING COMPOSITION

FIELD OF THE INVENTION

The invention relates to compositions for removing dried paint, and particularly relates to cleaning compositions for removing graffiti.

BACKGROUND OF THE INVENTION

It is well known that graffiti has become a common eyesore in many cities. A common solution is to simply paint over the offensive markings. However, often, the underlying graffiti will bleed through the paint, particularly if only one coat of paint is used. Further, on a large surface, repainting the smaller area having the graffiti typically will not match the older paint on the remainder of the surface. Repainting the entire surface is even more expensive and time consuming. Additionally, there is considerable expense involved in cleaning traffic signs, such as stop signs, since the sign must be removed and replaced, and then taken to a shop for cleaning; a labor intensive process.

Graffiti is often difficult to remove with conventional solvents. Even then, conventional paint removers such as organic paint solvents, e.g. turpentine, are volatile and have low flash points and have high evaporation rates which make them difficult to use. Further, many solvents, while removing the graffiti, also damage the underlying paint layer and/or surface. A number of chemical compositions for removing graffiti and dried paint in general have been proposed.

For example, U.S. Pat. No. 5,024,780 describes a cleaner to remove graffiti, paint and other coatings, from a surface. The cleaner comprises N-methyl pyrrolidone; propylene carbonate; hydroxy propyl cellulose thixotropic thickening agent; an ingredient selected from the group consisting of diethylene glycol monoethyl ether acetate, dipropylene glycol monomethyl ether acetate, dipropylene glycol methyl ether, diethylene glycol ethyl ether and isocetyl alcohol; and a surfactant.

A cleaner for removing graffiti including ink, marking pen marks and paint from a variety of substrates or surfaces is mentioned in U.S. Pat. No. 5,346,640, which is a continuation-in-part application of a continuation application which became the '780 patent mentioned above. The base composition for all five embodiments comprises N-methylpyrrolidone, propylene carbonate, isocetyl alcohol, an ingredient selected from the group consisting of dipropylene glycol monomethyl ether acetate and dipropylene glycol methyl ether acetate, a thickening agent and a surfactant. Each species or embodiment varies the range of these ingredients and some embodiments include other ingredients, such as dimethyl sulfoxide, a tertiary amine and mineral oil and lavender oil. Each embodiment is directed to a different type of substrate or surface to maximize the removal of graffiti on a surface without any deleterious effects to that surface.

The compositions of the two patents just mentioned are rather complex in that at least six components are required for each composition. In general, the more ingredients a composition has, the more expensive it is to make, both from the cost of the raw materials and the cost of more involved processing to make it. Moreover, these prior art compositions contain ethers, which may have flammability and/or toxicity concerns. It is desirable for paint remover compositions to have very high flash points, but perhaps did not have so many ingredients.

SUMMARY OF THE INVENTION

Accordingly, it is an object of the present invention to provide a paint remover composition that is biodegradable.

It is another object of the present invention to provide a paint remover composition that has a high flash point, but relatively few ingredients.

It is yet another object of the invention to provide a paint remover composition that has a low toxicity rating and which remains homogeneous under reasonable conditions of use and storage.

In carrying out these and other objects of the invention, there is provided, in one form, a composition for removing paint comprising an alkylene carbonate selected from the group consisting of propylene carbonate, butylene carbonate and mixtures thereof, propylene glycol as a hydrotrope and a polypropylene glycol having a molecular weight of at least 200. Optionally, a hydroxyalkylcellulose may be used as a thickening agent. For example, hydroxymethylcellulose may be used in an amount of at least 0.1 volume percent.

DETAILED DESCRIPTION OF THE INVENTION

The invention concerns a graffiti and paint removing composition that has only three required components.

The alkylene carbonate is the primary active agent that removes the paint, and it is selected from the group of propylene carbonate, butylene carbonate and mixtures thereof. In one embodiment, alkylene carbonate is present in a proportion of from about 15 to about 90 volume percent. In another embodiment, it is especially preferred that the alkylene carbonate be present in a proportion of from about 20 to about 80 volume percent. It is especially preferred that the alkylene carbonate be present in a proportion of from about 50 to about 75 volume percent. Ethylene carbonate is to be avoided for toxicity reasons and the fact that it is a solid.

The second required component is polypropylene glycol (PPG). PPG is used to modify viscosity. By polypropylene glycol is meant propylene glycol that has been oligomerized or polymerized, so that it has an average molecular weight of at least 200; preferably between about 400 and about 4,000. For example, PPG-2000, a 2000 average molecular weight polypropylene glycol available from Huntsman Corporation is a suitable component. For the purposes of this description, molecular weight is defined as number average molecular weight. The proportion of PPG used, based on the total paint remover composition, may range from about 2 to about 30 volume percent; preferably from about 5 to about 15 volume percent.

A third required component is a hydrotrope used to keep the other two components together in the mixture. A hydrotrope is understood to be a chemical which has the property of increasing the aqueous solubility of slightly soluble organic chemicals. A hydrotrope's ratio of charge to hydrophobic bulk is high. A surfactant and a hydrotrope are not the same thing. It is possible, however, to use a generic chemical term for a class of compounds, some of which would fall within the definition of surfactant and others of the class which would fall within the definition of hydrotrope.

"Hydrotropes have been known for decades as organic substances that increase the solubility in water of other organic substances. They have a structure somewhat similar to those of surfactants in that they have a hydrophilic and a hydrophobic group in the molecule, but different from surfactants in that the hydrophobic group is generally short, cyclic and/or branched. Typical hydrotropes include sodium benzene-, toluene-, xylene-, cumene-, and p-cymenesulfonates, 1-hydroxy-2-naphthoate, 2-hydroxy-1-naphthalene-sulfonate, and sodium 2-ethylhexyl sulfate." *Surfactants and Interfacial Phenomena*, pp. 184–185

"Hydrodropes, [sic] when present in an aqueous phase at sufficient concentration, can increase the solubility of sparingly soluble solutes in the aqueous phase. This unusual property of hydrotropes was reported for the first time by Neuberg in 1916." V. G. Gaikar, et al., "Separations Through Reactions," *Separation and Purification Methods*, Vol. 18, No. 2, pp. 11–176, pages 142–147 and 170–173

The word hydrotrope was introduced 67 years ago by Neuberg. In his treatment and in the subsequent ones the hydrotropes were investigated for their solubilizing power in aqueous solutions.
A change in the perception of their mechanism of action came in the sixties when Lawrence pointed out that short chain surfactants would delay the gelling to a liquid crystalline phase which takes place at high surfactant concentrations. Friberg and Rydhag showed that hydrotropes, in addition, prevent the formation of lamellar liquid crystals in combinations of surfactants with hydrotropic amphiphiles, such as long chain carboxylic acids and alcohols. . . .
The hydrotropes in this era were short chain sulfonates, with the p-xylene sodium sulfonate as a typical example. Their action is [sic] preventing the formation of liquid crystals is easily understood from a direct comparison of their molecular geometry. . . .
The short bulky aromatic compound does not pack well in a lamellar liquid crystalline structure, the mutual stabilizing action of the straight hydrocarbon chain is lost, and instability results. S. Friberg, et al., "Hydrotropic Function of a Dicarboxylic Acid," M. J. Rosen, ed., *Structure/Performance Relationships in Surfactants*, ACS Symposium Series, 253, 1984, pp. 107–116.

The preferred hydrotrope for the composition of this invention is propylene glycol. In one embodiment, its proportion ranges from about 3 to about 50 volume percent; preferably from about 5 to 45 volume percent.

An optional component is a hydroxyalkylcellulose thickening agent. For example, the thickening agent may be selected from the group consisting of hydroxymethylcellulose, hydroxyethylcellulose, hydroxypropylcellulose, hydroxybutylcellulose, and the like and mixtures thereof. A preferred thickening agent is hydroxymethylcellulose, which is available under the trademark NATROSOL®. It is preferred that the thickening agent be present in an amount of at least 0.1 volume %, based on the total mixture. It is especially preferred that the thickening agent be present in a proportion of from about 0.1 to about 1.0 volume percent. However, a thickener is not required for this invention. Thickeners may be desirable to improve the residence time of the graffiti removing composition on porous surfaces that may be more difficult to clean, such as wood and concrete.

Cellulose-based thickeners usually require an aqueous-based system for effective use. Ordinarily, they are not very soluble in carbonates either. The use of propylene glycol (PG) or polypropylene glycol (PPG) or blends thereof surprisingly and effectively couples the propylene carbonate with the thickener.

However, an important feature of the inventive paint removing composition is that it does not require a complex mixture of components to work. For example, it is particularly preferred that the composition does not contain N-methylpyrrolidone, isocetyl alcohol and a surfactant. The composition should also not contain amines or dimethyl sulfoxide (DMSO). N-methylpyrrolidone (NMP) is moderately toxic by ingestion, intraperitoneal and intravenous routes. NMP is also a potential teratogen. In contrast, propylene carbonate is a slight skin irritant with no ingestion or skin absorption hazard known as of November 1993. Propylene glycol is used as a substitute for ethylene glycol for toxicity reasons and for improved biodegradability. Indeed, the use of generally propylene-based components make this composition more biodegradable. Propylene glycol is commonly used in the food industry. Polypropylene glycol is moderately toxic by intravenous routes, but only mildly toxic by ingestion and intraperitoneal routes. Note that relatively little of the PPG is used.

While still other components may be included, an advantage of this invention is that many additives or components are not required. For example, some cleaning compositions require odor masking agents, such as lavender oils, but such are not required for the inventive composition.

The paint removing composition of the invention offers several significant advantages. For example, all of the components are readily biodegradable; three of the components being propylene-based. The final composition has also been determined to have a high flash point, that is, above 250° F. The composition additionally is expected to have a low toxicity rating, based on the relatively low toxicity of the components.

Additionally, the viscosity and strength (concentration) can be easily controlled to modify the product's ability to clean vertical surfaces. That is, the proportion of thickener may be adjusted so that the composition will adhere longer to a vertical or highly inclined substrate. The concentration or strength of the composition may be adjusted by controlling the propylene carbonate proportion. Further, the composition maintains its homogeneous nature under reasonable conditions of use and storage. Finally, the product contains no halogenated solvents, has low volatility, contains no nitrogen-bearing molecules (potential carcinogens), no esters, ethers or ketones (flammability and toxicity hazards). The composition also contains no acids or bases.

The composition of this invention has been tested on metal coupons painted with a variety of paint types, including enamel, lacquer, primer and epoxy paints, etc. All were easily removed within 0 to 5 minutes by applying the composition to a dry cloth and rubbing gently in a circular motion.

EXPERIMENTAL PROCEDURE

Three by five inch metal panels were coated with several layers of paint. Types of paint included epoxy, primer, enamel and urethane. The panels were allowed to dry overnight (12 hours) and then were cleaned with two variations of the graffiti/paint remover:

TABLE I

| | Formulations by Volume Percent | |
|---|---|---|
| Component | Formula 1 | Formula 2 |
| Propylene carbonate (PC) | 90% | 50 |
| PPG-2000 | 5% | 5 |
| Propylene glycol | 5% | 45 |

Some samples were left alone for 90 days before removal of the paint was attempted. Both Formulas removed the paints rather easily, within 5 minutes. Formula 1 worked a bit faster than Formula 2, probably due to the higher amount of PC. In field tests on street signs and cars and trucks for graffiti removal, Formula 2 was preferred. This was because Formula 1 tended to remove the glossy surface common to most stop signs and street signs, whereas Formula 2 did not have this effect.

As noted, the paint removing composition of the invention, with the composition given above, has also been field tested on stop signs, automobiles, street signs, metal surfaces in general, concrete, wood, brick, plastic, glass, clothing, etc., and has performed extremely well with no damage to the substrate. The paint removing composition does not affect glass finishes. On more porous surfaces, such as wood, concrete, etc., it may be desirable to include a thickener to increase the residence time of the cleaning composition on the surfaces being cleaned.

Many modifications may be made in the paint removing composition of this invention without departing from the spirit and scope thereof which are defined only by the appended claims. For example, it may be discovered that a particular formulation works well on a particular paint or ink, and/or a particular surface.

I claim:

1. A surfactant-free composition for removing paint consisting essentially of:

from about 15 to about 90 volume percent of an alkylene carbonate selected from the group consisting of propylene carbonate, butylene carbonate and mixtures thereof;

from about 3 to about 50 volume percent of propylene glycol; and from about 2 to about 30 volume percent of a polypropylene glycol having a molecular weight of at least 200 wherein the total amount of said alkylene carbonate, propylene glycol, and polypropylene glycol in said composition is essentially 100% by volume.

2. The surfactant-free composition of claim 1 where the proportion of alkylene carbonate ranges from about 20 to about 80 volume percent, and the proportion of polypropylene glycol ranges from about 5 to about 15 volume percent.

3. A surfactant-free composition for removing paint consisting essentially of:

from about 20 to about 80 volume percent of propylene carbonate;

from about 5 to about 45 volume percent of propylene glycol;

from about 2 to about 30 volume percent of a polypropylene glycol having a molecular weight of at least 200; and at least 0.1 volume percent of a hydroxyalkylcellulose thickener, where the hydroxyalkylcellulose thickener is selected from the group consisting of hydroxymethylcellulose, hydroxyethylcellulose, hydroxypropylcellulose, hydroxybutylcellulose, and mixtures thereof wherein the total amount of said alkylene carbonate, propylene glycol, polypropylene glycol, and hydroxyalkycellulose thickener in said composition is essentially 100% by volume.

* * * * *